US008532007B2

(12) United States Patent
Araki (10) Patent No.: US 8,532,007 B2
(45) Date of Patent: Sep. 10, 2013

(54) ASSIGNING COMMUNICATION MEDIA TO A TERMINAL BASED ON REMAINING BATTERY AMOUNT

(75) Inventor: Motohisa Araki, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 13/164,716

(22) Filed: Jun. 20, 2011

(65) Prior Publication Data

US 2011/0249670 A1    Oct. 13, 2011

Related U.S. Application Data

(63) Continuation of application No. 12/611,030, filed on Nov. 2, 2009, now abandoned.

(30) Foreign Application Priority Data

Nov. 21, 2008    (JP) ................................. 2008-298543

(51) Int. Cl.
*H04W 52/02*    (2009.01)
(52) U.S. Cl.
USPC ........ 370/311; 370/252; 370/331; 455/343.2; 455/422.1; 455/436
(58) Field of Classification Search
USPC ................. 370/252, 311, 331–333, 352–356; 455/343.1, 343.2, 343.3, 343.4, 343.5, 422.1, 455/436–444; 709/226, 229
See application file for complete search history.

(56) References Cited

U.S. PATENT DOCUMENTS

| | | | | |
|---|---|---|---|---|
| 5,854,875 A | * | 12/1998 | Yamagishi | ..................... 386/200 |
| 6,131,136 A | * | 10/2000 | Liebenow et al. | ............ 710/316 |
| 6,901,275 B1 | * | 5/2005 | Aoyagi | ......................... 455/574 |
| 7,251,737 B2 | | 7/2007 | Weinberger et al. | |
| 7,499,734 B2 | | 3/2009 | Kogure | |
| 7,657,273 B2 | * | 2/2010 | Haartsen | ....................... 455/522 |

(Continued)

FOREIGN PATENT DOCUMENTS

| | | |
|---|---|---|
| JP | 07-327267 | 12/1995 |
| JP | 2000-138758 | 5/2000 |

(Continued)

OTHER PUBLICATIONS

Japanese Patent Application No. 2008-298543, Notice of Reasons for Rejection, mailed Jan. 26, 2010 (English Translation).

(Continued)

*Primary Examiner* — Hoon J Chung
(74) *Attorney, Agent, or Firm* — Blakely, Sokoloff, Taylor & Zafman LLP (57) ABSTRACT

According to one embodiment, a server apparatus for executing communication connection between a first terminal being connected to a first communication network, and a second terminal being connected to a second communication network, includes a memory, an acquisition module and a controller. The memory stores an electric quantity table and a media determining table. The acquisition module acquires remaining information of the battery from the first terminal. The controller refers to the electric quantity table and the media determining table to select a communication media based on the acquired remaining amount information of the battery and consumed electricity by the first terminal. When a request for the first terminal is received, controller assigns the selected communication media to the first terminal, when the battery remaining amount of the first terminal varies during communication, the controller re-determines to change the communication media.

2 Claims, 6 Drawing Sheets

(56) References Cited

U.S. PATENT DOCUMENTS

| | | | |
|---|---|---|---|
| 7,836,321 B2* | 11/2010 | Aaltonen et al. | 713/340 |
| 7,844,307 B2* | 11/2010 | Henson et al. | 455/574 |
| 7,848,776 B2* | 12/2010 | Akiba et al. | 455/552.1 |
| 2005/0048960 A1* | 3/2005 | Yamauchi et al. | 455/418 |
| 2006/0063560 A1* | 3/2006 | Herle | 455/552.1 |
| 2006/0223465 A1* | 10/2006 | Akiba et al. | 455/127.4 |
| 2007/0004376 A1 | 1/2007 | Kogure | |
| 2007/0121536 A1* | 5/2007 | Aihara | 370/318 |
| 2007/0202837 A1* | 8/2007 | Araki et al. | 455/343.3 |
| 2008/0119242 A1* | 5/2008 | Cho | 455/574 |
| 2008/0192666 A1* | 8/2008 | Koskan et al. | 370/311 |
| 2009/0164823 A1* | 6/2009 | Aaltonen et al. | 713/340 |
| 2009/0325622 A1* | 12/2009 | Matsumura et al. | 455/522 |
| 2010/0009674 A1* | 1/2010 | Sapkota et al. | 455/426.1 |
| 2010/0128719 A1* | 5/2010 | Araki | 370/352 |
| 2010/0273486 A1 | 10/2010 | Kharia et al. | |

FOREIGN PATENT DOCUMENTS

| | | |
|---|---|---|
| JP | 2001-285190 | 10/2001 |
| JP | 2003-309878 | 10/2003 |
| JP | 2004-080367 | 3/2004 |
| JP | 2004-246811 | 9/2004 |
| JP | 2005-165697 | 6/2005 |
| JP | 2006-191455 | 7/2006 |
| JP | 2006-303902 | 11/2006 |
| JP | 2007-235197 | 9/2007 |
| JP | 2007-267335 | 10/2007 |
| JP | 2008-219439 | 9/2008 |

OTHER PUBLICATIONS

U.S. Appl. No. 12/611,030, Office Action, mailed Dec. 9, 2010.

U.S. Appl. No. 12/611,030, final Office Action, mailed Mar. 18, 2011.

* cited by examiner

F I G. 1

F I G. 2

Battery state table

| Terminal ID | Terminal type | Present battery remaining amount | Charging state | Connection state | Notice period |
|---|---|---|---|---|---|
| Alice | A terminal | 80% | During discharge | During connection | 5min |
| Bob | B terminal | 60% | During discharge | During connection | 10min |
| ... | | | | | |

F I G. 3

Transfer destination table

| Terminal ID | Battery remaining amount | Transfer destination |
|---|---|---|
| Alice | 60~100% | None |
| | 20~60% | Carol |
| | 0~20% | Voice Mail |
| Bob | 60~100% | None |
| | 20~60% | None |
| | 0~20% | Bob2 |
| ... | | |

F I G. 4

Electric quantity table

| Terminal type | Media type | Terminal consumed electricity |
|---|---|---|
| A terminal | Moving image | 1.0 |
| | Voice | 0.7 |
| | IM | 0.2 |
| | E-Mail | 0.1 |
| B terminal | Moving image | 0.5 |
| | Voice | 0.1 |
| | IM | 0.05 |
| | E-Mail | 0.02 |
| ... | | |

F I G. 5

Communication media determining table

| Terminal type | Battery remaining amount | Terminal consumed electricity maximum quantity (threshold) |
|---|---|---|
| A terminal | 60~100% | ~1.5 |
| | 20~60% | ~0.8 |
| | 0~20% | ~0.2 |
| B terminal | 60~100% | None |
| | 20~60% | ~0.3 |
| | 0~20% | ~0.1 |
| ... | | |

F I G. 6

Incoming call preferential party table

| Terminal ID | Battery remaining amount | Group index | Transfer destination |
|---|---|---|---|
| Alice | 60~100% | None | None |
| | 20~60% | None | None |
| | 0~20% | 1 | None |
| Bob | 60~100% | None | None |
| | 20~60% | 1, 2 | Voice Mail |
| | 0~20% | 1 | Voice Mail |
| ... | | | |

F I G. 7

Group table

| Group index | Terminal ID |
|---|---|
| 1 | Carol |
| | David |
| 2 | Eden |
| | Fred |
| | Gabriel |
| ... | |

F I G. 8

Incoming call notice table

| Terminal ID | Battery remaining amount | Incoming call notice media |
|---|---|---|
| Alice | 60~100% | IM |
| | 20~60% | E-Mail |
| | 0~20% | None |
| Bob | 60~100% | E-Mail |
| | 20~60% | E-Mail |
| | 0~20% | E-Mail |
| ... | | |

F I G. 9

F I G. 10

F I G. 11

F I G. 12

ASSIGNING COMMUNICATION MEDIA TO A TERMINAL BASED ON REMAINING BATTERY AMOUNT

CROSS-REFERENCE TO RELATED APPLICATIONS

This application is a Continuation of U.S. patent application Ser. No. 12/611,030 filed Nov. 2, 2009, which is based upon and claims the benefit of priority from the Japanese Patent Application No. 2008-298543, filed Nov. 21, 2008, the entire contents of which are incorporated herein by reference.

BACKGROUND

1. Field

One embodiment of the invention relates generally to a system, such as an Internet Protocol (IP) telephone system, for performing multimedia communication among terminals via an IP network. More specifically, the present invention relates to a server apparatus for executing communication among terminals connected to the IP network and battery-driven terminals, and relates to battery-driven terminal apparatuses.

2. Description of the Related Art

In recent years, an IP telephone system for interactively transmitting/receiving images and voices, as packet data, in real time has been in widespread use. The IP telephone system accommodates a plurality of IP telephone terminals in an IP network such as a local area network (LAN) and the Internet, and connects the IP network to a public network through a gateway, wherein the gateway converts addresses and then enables multimedia information communication among IP telephone terminals, and among the IP telephone terminals and the public network.

Meanwhile, the system mentioned above enables the multimedia information communication also among battery-driven and small-sized portable terminals and the IP telephone terminals. In this case, a communication server side does not specifically acquire information of battery states of the terminals, and provides uniform communication services regardless of the battery states of the terminals.

Therefore, when remaining battery amounts are small, if not important incoming calls or communication using moving images has occurred, the batteries become in short of those remaining amounts, and important communication may be interrupted in the middle thereof or may not be received.

Conventionally, a client system in which battery-driven terminals transmit information of remaining amounts of batteries to a server apparatus, and the server apparatus which has received this information switches a kind of content data to be transmitted in response to the remaining battery amounts is disclosed (e.g., Jpn. Pat. Appln. KOKAI Publication No. 2007-267335).

Meanwhile, the foregoing client system switches the kind of the content data to be transmitted in response to the remaining battery amounts, and does not provide any communication service corresponding to the remaining battery amounts.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a server apparatus for executing communication connection between a first terminal being connected to a first communication network, and a second terminal being connected to a second communication network differing from the first communication network, wherein the first terminal is assigned a terminal ID and is driven by electricity from a battery, the server apparatus comprising: a memory configured to store a management table, wherein the management table showing a correspondence relationship among the terminal ID, a remaining amount of the battery, and an additional service concerning call origination and call termination; an acquisition module configured to acquire remaining information of the battery from the first terminal; and a controller configured to refer to the management table based on the remaining information of the battery, when an execution request for the additional service is issued, and execute an additional service corresponding to the remaining amount of the battery based on a reference result of the management table.

First Embodiment

Figure 1:
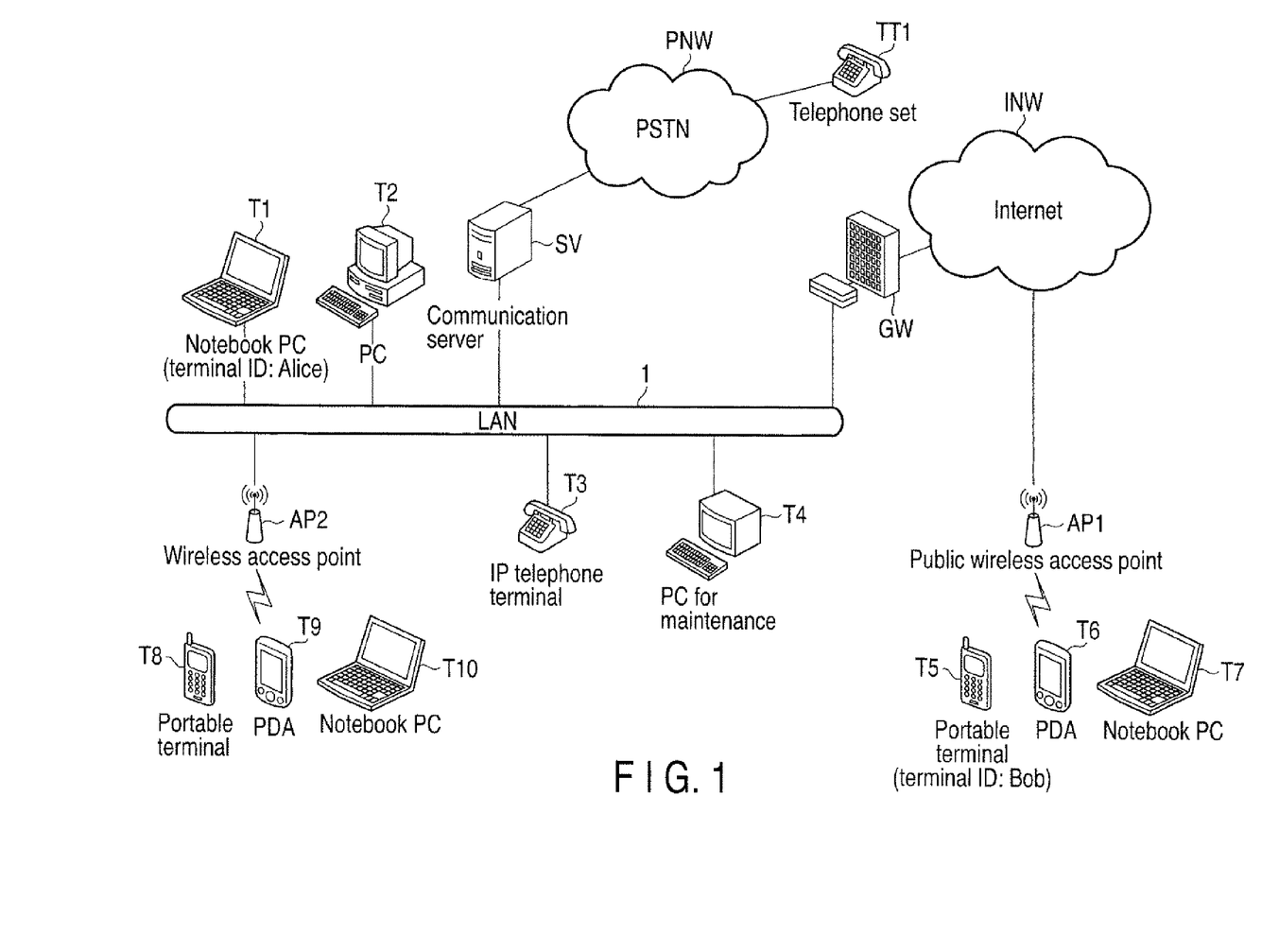
FIG. 1 is an exemplary schematic configuration view depicting a communication system regarding a first embodiment of the invention.

FIG. 1 shows a schematic configuration view illustrating a communication system regarding a first embodiment of the invention.

The system includes the Internet INW and a LAN 1 for packet communication. Terminals T1-T4 are connected to the LAN 1, and terminals T5-T7 are connected to the Internet INW via an access point AP1 and a wireless LAN. The terminals T1-T4 are IP telephone terminals with speech processing functions and medium information processing functions, or software-implemented phones realized by software on a personal computer.

A gateway GW is connected between the LAN 1 and the Internet INW. The gateway GW connects between the LAN 1 and the internet INW, and has a conversion function of a communication protocol and a signal format between the LAN 1 and the Internet INW.

Terminals T8-T10 are connected to the LAN 1 via an access point AP2 and a wireless LAN. The terminals T5-T10 are wireless LAN-connectable and battery-driven portable telephone terminals.

Further, a communication server SV is connected to the LAN 1. The communication server SV has a conversion control function for the terminals T1-T10 and the gateway GW. A public network PNW is connected to the communication server SV. An external telephone terminal TT1 is connected to the public network PNW.

Figure 2:
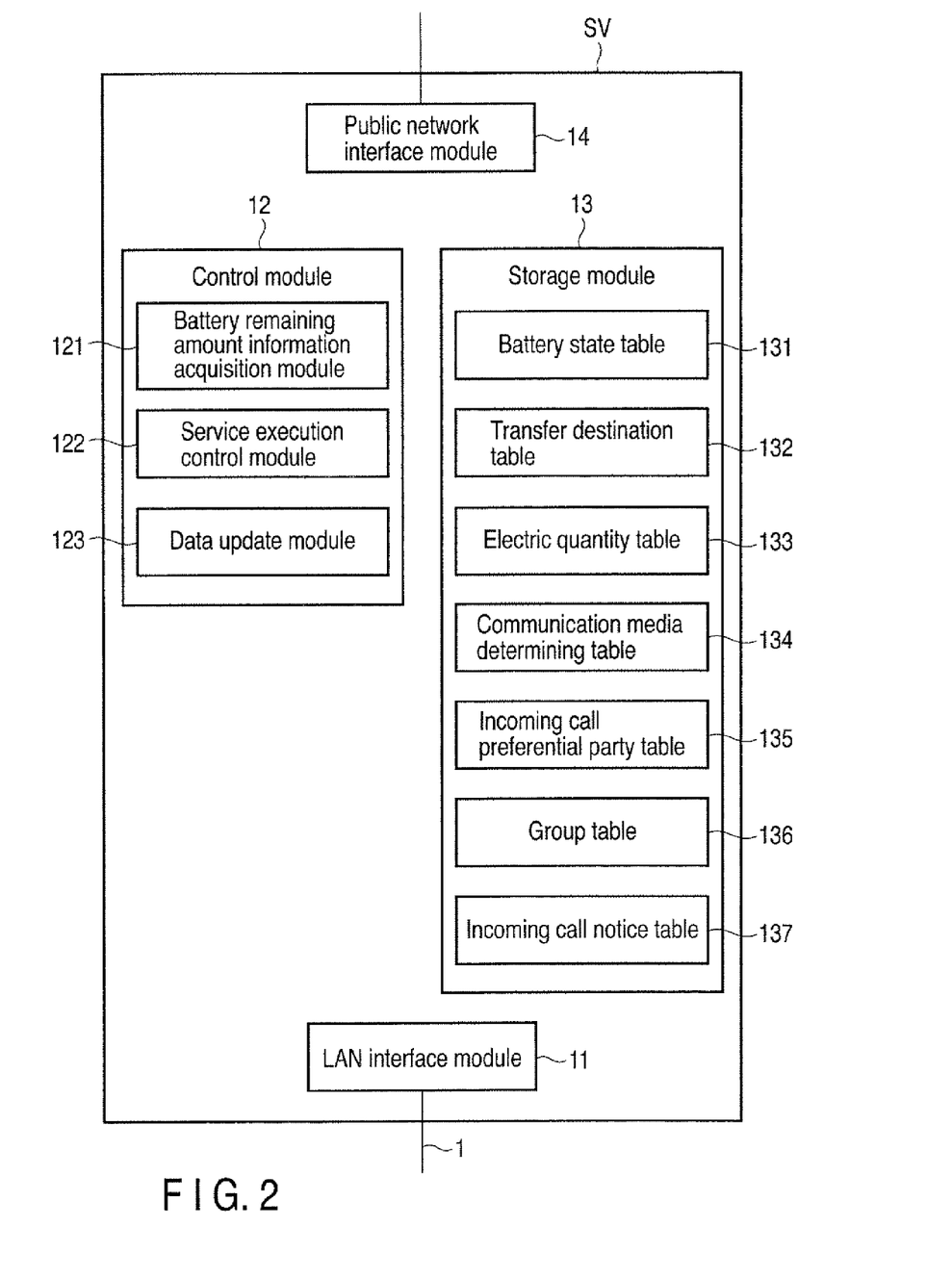
FIG. 2 is an exemplary block diagram depicting a functional configuration of a communication server shown in FIG. 1.

Meanwhile, the communication server SV has the following functions as functions of the invention. FIG. 2 shows a block diagram illustrating the configuration of the foregoing functions.

That is, the communication server SV includes a LAN interface module 11, a control module 12, a storage module 13, and a public network interface module 14. Among of these modules, the LAN interface module 11 executes interface processing to and from the LAN 1.

The public network interface module 14 executes interface processing to and from the public network PNW.

The storage module 13 stores routing information, etc., which is necessary for connection control by the control module 12, and has a mail box for recording a voice message from a caller. Further, the storage module 13 includes a battery state table 131, a transfer destination table 132, an electric quantity table 133, a communication media determining table 134 (referred to as a table 134), an incoming call preferential party table 135 (referred to as a table 135), a group table 136, and an incoming call notice table 137.

Figure 3:
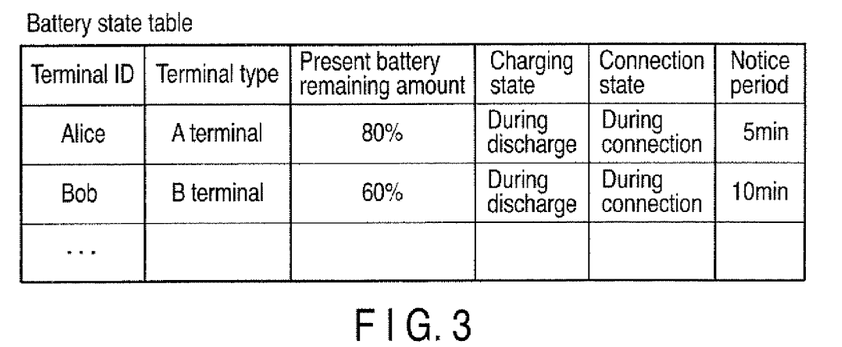
FIG. 3 is an exemplary view depicting an example of storage content of a battery state table shown in FIG. 2.

As shown in FIG. 3, data, showing a correspondence relationship among each terminal ID of the terminals T1-T10, a terminal type indicating a personal computer, a personal digital assistant (PDA), a portable telephone terminal, and those equivalents, present battery remaining amounts, charging states, connection states, and notice periods, is stored in the battery state tables 131.

Figure 4:
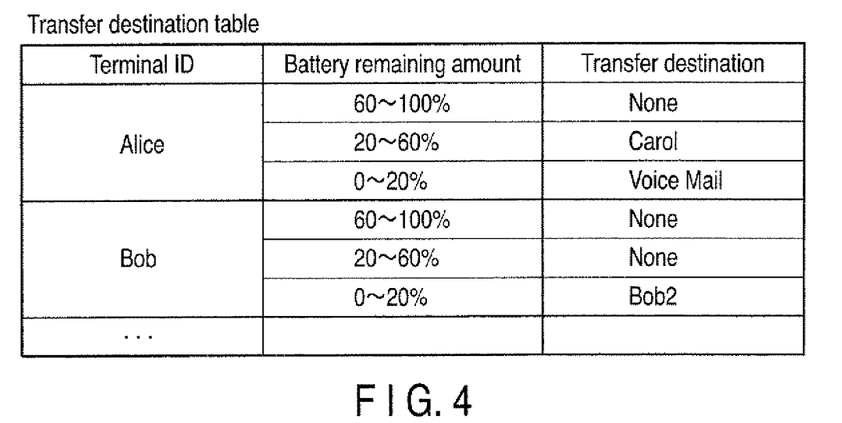
FIG. 4 is an exemplary view depicting an example of storage content of a transfer destination table shown in FIG. 2.

As shown in FIG. 4, data, showing a correspondence relationship among each terminal ID of the terminals T1-T10, the battery remaining amounts and the transfer destinations, is stored in the transfer destination table 132.

Figure 5:
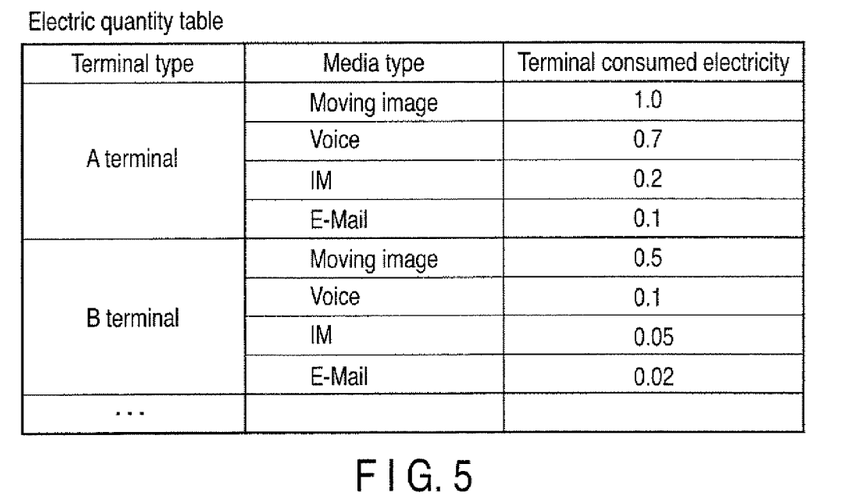
FIG. 5 is an exemplary view depicting an example of storage content of an electric quantity table shown in FIG. 2.

As shown in FIG. 5, data, showing a correspondence relationship among the terminal types, the media types, and terminal consumed electricity, is stored in the electric quantity table 133.

Figure 6:
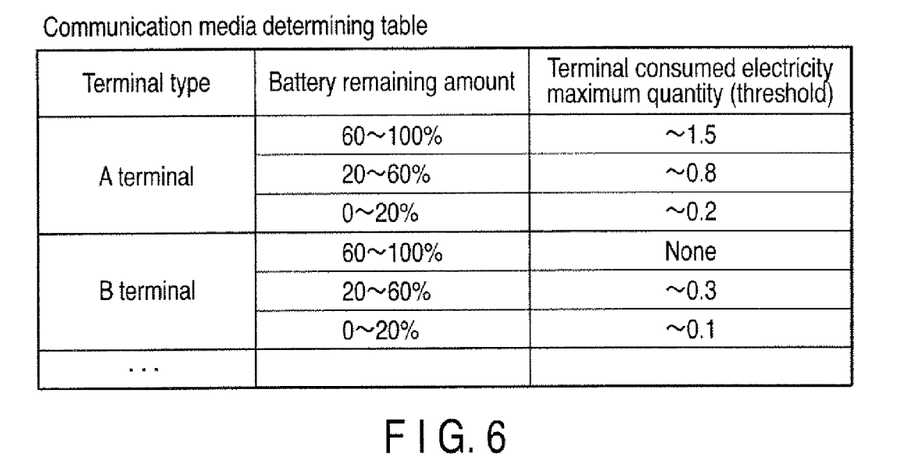
FIG. 6 is an exemplary view depicting an example of storage content of a communication medium determining table shown in FIG. 2.

As shown in FIG. 6, data, showing a correspondence relationship among the terminal types, the battery remaining amounts, and terminal consumed electricity maximum quantity (threshold), is stored in the table 134.

Figure 7:
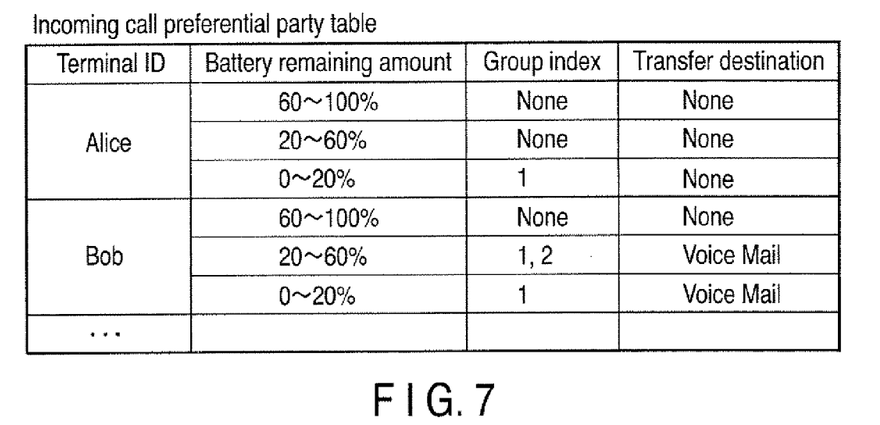
FIG. 7 is an exemplary view depicting an example of storage content of an incoming call preferential party table shown in FIG. 2.

As shown in FIG. 7, data, showing a correspondence relationship among each terminal ID of the terminals T1-T10, the battery remaining amounts, group indices, and the transfer destinations, is stored in the table 135.

Figure 8:
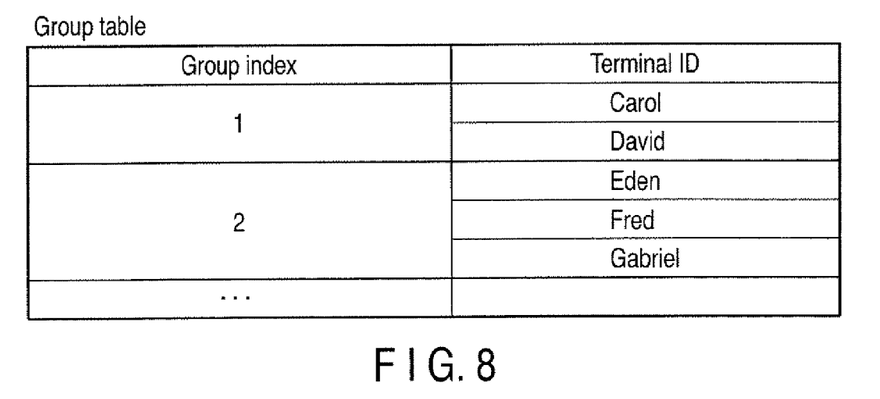
FIG. 8 is an exemplary view depicting an example of storage content of a group table shown in FIG. 2.

As shown FIG. 8, data, showing a correspondence relationship among the group indices specifying a plurality of groups composed of the terminals T1-T10, and each terminal ID of the terminals T1-T10, is stored in the group table 136.

Figure 9:
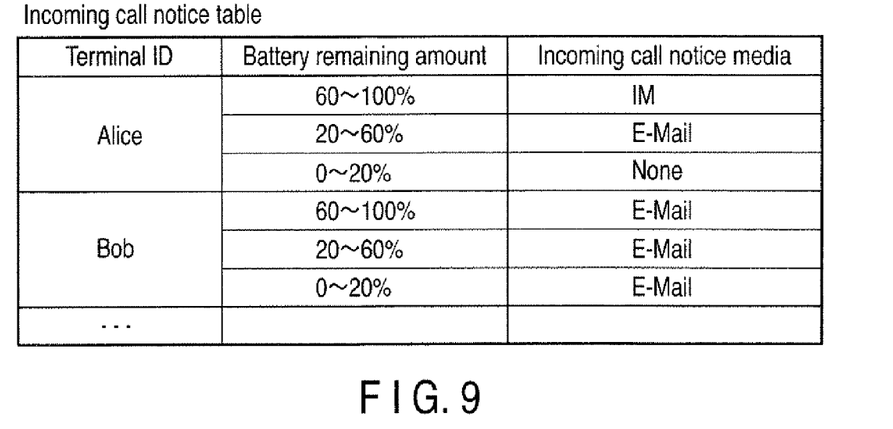
FIG. 9 is an exemplary view depicting an example of storage content of an incoming call notice table shown in FIG. 2.

As shown in FIG. 9, data, showing a correspondence relationship among each terminal ID of the terminals T1-T10, the battery remaining amounts, and the incoming call notice media, is stored in the incoming call notice table 137.

Meanwhile, the control module 12 includes, as new functions of the invention, a battery remaining amount information acquisition module 121 (referred to as an acquisition module 121), a service execution control module 122 (referred to as a control module 122), and a data update module 123a in addition to a control function regarding the state management of the terminals T1-T10.

The acquisition module 121 acquires the battery remaining information from the corresponding-terminals T1-T10 in the notice periods registered in the battery state table 131.

When a service execution request has occurred, the control module 122 refers to at least one of the battery state table 131, the transfer destination table 132, the electric quantity table 133, the table 134, the table 135, and the incoming call notice table 137 based on the battery remaining amount information acquired by the acquisition module 121 to execute the service corresponding to the battery remaining amounts from the reference result.

When receiving a data change request from, for example, the terminal T4 for maintenance, the data update module 123 updates at least one of the transfer destination table 132, the electric quantity table 133, the table 134, the table 135, the group table 136, and the incoming notice table 137.

Next, operations of the communication system composed as mentioned above will be described.

[Battery State Notice]

In a case where the terminal T5 (terminal ID: Bob) is connected to the communication server SV, the terminal T5 detects the battery state in its own terminal T5 to periodically notice the battery remaining amount, the charge/discharge state, the terminal type, to the communication server SV. The communication server SV which has received the notice rewrites the content in the battery state table 131 by using the received notice. A notice period of the battery states from the terminal T5 is stored in the battery state table 131, and the terminal T5 notices the battery state in accordance with the period. The value of the period may be set by the terminal T5, and may be set by the communication server SV by using the terminal T4 for maintenance. The communication server SV may periodically acquire the battery remaining amounts, the charge/discharge states, and the terminal types from the respective terminals T1-T10.

[Incoming Call Transfer Operation]

Figure 10:
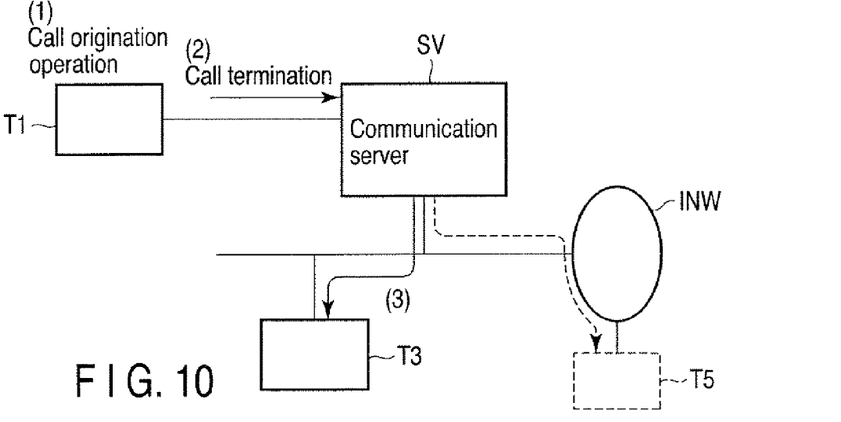
FIG. 10 is an exemplary view for explaining an incoming call transfer operation in the first embodiment.

Now, as shown in FIG. 10, it is assumed that the terminal T1 (terminal ID: Alice) originates a call to the battery-driven terminal T5 (terminal ID: Bob) (FIG. 10 (1)). Then, the communication server SV which has received a call request from the terminal T1 (terminal ID: Alice) refers to the battery state table 131 and the transfer destination setting table 132, and determines whether the call should be terminated at the terminal T5 of the incoming call destination or should be transferred to the transfer destination depending on the reference result (FIG. 10 (2)). That is, the communication server SV specifies the transfer destination in response to the battery state of the terminal T5 and then transfers the call termination at the own terminal T5 to the terminal T3 to be the incoming call transfer destination. The communication server SV transmits incoming call data to the terminal T3 to be the incoming call transfer destination and makes the terminal T3 perform incoming call notice (FIG. 10 (3)).

Thereby, especially, when the battery remaining amount becomes small, the communication server SV may prevent the incoming call from being terminated at the terminal T3 to be the incoming call transfer destination, and may prevent the communication from being intercepted due to the shortage of the battery remaining amount in the middle of the communication with a partner.

[Setting Change Operation of Communication Medium]

Figure 11:
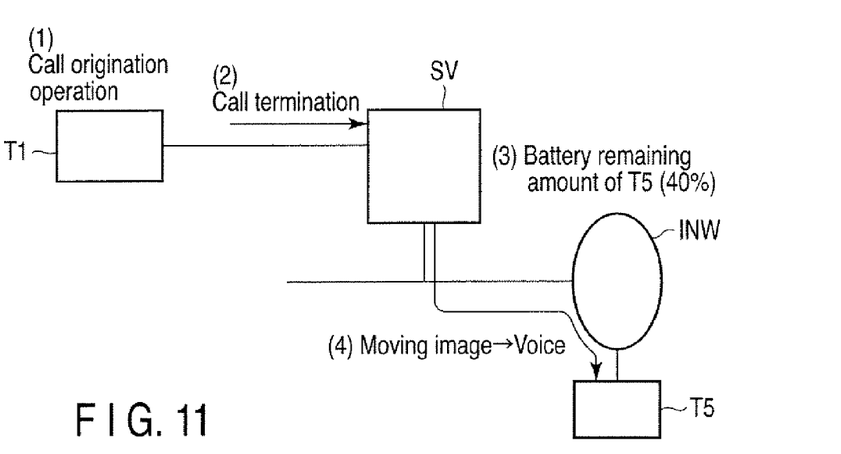
FIG. 11 is an exemplary view for explaining a switch operation of communication media in the first embodiment.

Now, as shown in FIG. 11, it is assumed that the terminal T1 (terminal ID: Alice) issues a call request using "moving image" as a communication media to the battery-driven terminal T5 (terminal ID: Bob) (FIG. 11 (1)). The communication server SV which has received the call request from the terminal T1 (terminal ID: Alice) refers to the battery state table 131 and the electric quantity table 133 corresponding to the terminal T5 that is the incoming call destination, and the communication media determining table 134 (FIG. 11 (2)), determines the media for communicating depending on the reference result, and makes the call termination at the terminal T5 that is the incoming call destination. Here, if the battery remaining amount of the terminal T5 is 40% (FIG. 11 (3)), the communication server SV changes the communication media from the "moving image" to "voice" (FIG. 11 (4)).

As a result, the communication server SV can use communication media each corresponding to the battery states of the terminals. That is, if the battery remaining amount is sufficient, the communication server SV can use simple media such as "moving image" and "video" making the consumption electricity of the terminal become large. If the battery remaining amount becomes small, the communication server SV can use a media such as solely "voice" or an instant message (IM) consuming a relatively small electric quantity. Thereby, especially, when the battery remaining amount becomes small, the communication system can prevent the communication from being intercepted in the middle of the communication with a partner due to the shortage of the battery remaining amount, and as a result, the communication system can extend a duration of the battery. Here, the electric quantity table 133 may be set by the user from the terminal T4 for the maintenance to the communication server SV, and may be set the information required by the terminals through the communication server SV by transmitting the required information to the communication server SV. If the battery remaining amount varies with periodical reference to the battery state table 131 during communication, the communication server SV may re-determine to change the communication media with reference to the electric quantity table 133 and the communication media determining table 134 again.

[Preferential Incoming Call Operation]

Next, it is assumed that the terminal T1 (terminal ID: Alice) has performed a call operation to the battery-driven terminal T5 (terminal ID: Bob). The communication server SV which has received a call request from the terminal T1 (terminal ID: Alice) refers to the battery state table 131, and the table 135 corresponding to the incoming call terminal T5. According to the battery remaining amount, if the corresponding-group index exists in the table 135, the communication server SV refers to the group table 136 to determine whether or not the call destination information is included in the group. As a result, if it is determined that the call destination information is included in the group, the communication server SV terminates the call as the incoming call destination terminal T5 to establish communication. When the determination of incoming call rejection is made, if the transfer destination is specified in the table 135, the communication server SV transfers the call to the specified transfer destination. That is, when the battery remaining amount becomes small, the communication server SV can accept incoming calls solely to partners that are important for the user, and reject incoming calls other than the foregoing incoming calls. Thereby, the communication server SV may prevent the occurrence of such a situation in which the battery remaining amounts of the terminals makes it impossible to perform really important communication.

[Presence Management]

Next, the communication server SV manages a presence state of each terminal T1-T10. It is assumed that the terminal T5 (terminal ID: Bob), at that time, the presence state thereof is "present". At this time, it is assumed that the terminal T1 (terminal ID: Alice) makes a call to the battery-driven terminal T5 (terminal ID: Bob). The communication server SV then may refer to the presence state to make the terminal T5 to be an incoming call destination, and may refer to the battery state table 131 and the transfer destination table 132 to transfer the call to the determined transfer destination.

(Incoming Call Notice Operation)

Next, it is assumed that the terminal T1 (terminal ID: Alice) performs a call operation to the battery-driven terminal T5 (terminal ID: Bob). At this time, since the battery remaining amount of the terminal T5 is small, it is assumed that an operation for transfer or incoming call rejection is performed. In such a case, the communication server SV may refer to the incoming call notice table 137 to acquire the type of an incoming call notice media corresponding to the terminal T5 and the battery remaining amount, and may notice, through the acquired media type, the fact of the call termination at the terminal T5 to be the incoming call destination. In this case, the call termination is noticed by E-mail.

In this way, the user of the terminal T5 may know the incoming call which has not been terminated because the battery remaining amount of the terminal T5 has been small. The content of the notice may be solely a call destination, and information accompanied by the notice may be added to the content.

As mentioned above, in the first embodiment, the battery state table 131, the transfer destination table 132, the electric quantity table 133, the table 134, the table 135, the group table 136, and the incoming call notice table 137 are stored in the storage module 13 of the communication server SV. The first embodiment periodically acquires the remaining amount information of the batteries from the terminals T1-T10 by means of the acquisition module 121. The first embodiment executes control for a predetermined service based on the battery state table 131, the transfer destination table 132, the electric quantity table 133, the table 134, the table 135, the group table 136, and the incoming call notice table 137 in response to requests from the terminals T1-T10 or a request from the external telephone terminal TT1 connected to the public network PNW.

Accordingly, when an incoming call terminated at the terminal T5 of which the battery remaining amount is in short, the communication server SV can prevent the communication from being intercepted during communication by automatically transmitting the incoming call to the incoming call transfer destination registered in the transfer destination table 132. Switching a communication medium from a media with large consumed electricity to a medium with small consumed electricity enables performing incoming call notice to the terminal T5 by E-mail with a small battery consumption amount, so that the user of the terminal T5 can confirm the fact of call termination without consumption of the battery. Further, if the terminal T5 performs incoming call transfer or incoming call rejection, referring to the incoming call notice table 137 based on the acquired remaining amount information of the battery enables incoming call notice to the terminal T5 by E-mail, so that the user of the terminal T5 can confirm the call termination without consumption of the battery.

Second Embodiment

Figure 12:
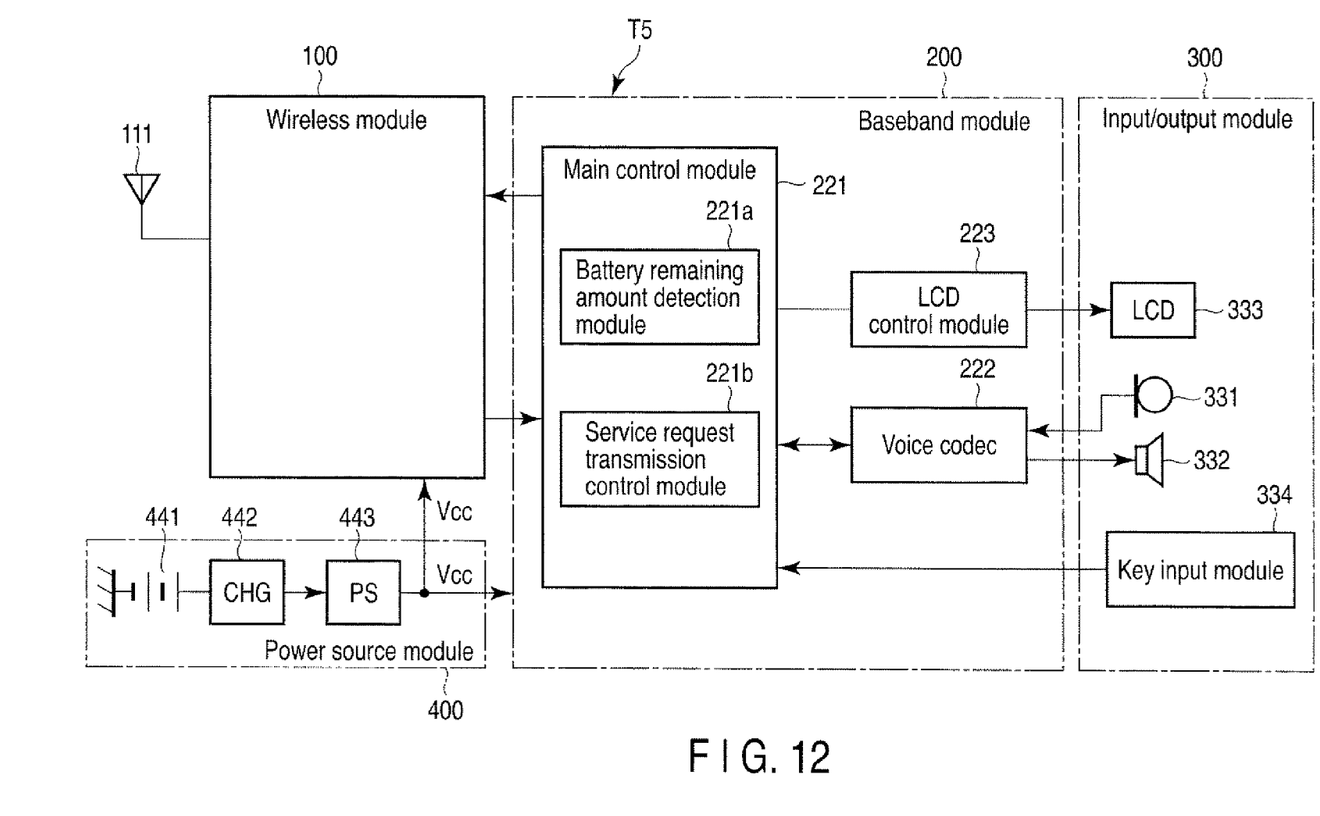
FIG. 12 is an exemplary block diagram depicting a functional configuration of a terminal regarding a second embodiment of the invention.

FIG. 12 shows a block diagram illustrating a functional configuration of a battery-driven terminal regarding a second embodiment of the invention. Here, the terminal T5 will be described as a representative.

The terminal T5 consists of a wireless module 100, a baseband module 200, an input/output module 300, and a power source module 400.

A wireless signal which has arrived from an access point AP1 via a wireless LAN is received by an antenna 111, and applied a predetermined signal processing by the wireless module 100 to be supplied to the baseband module 200.

The baseband module 200 includes a main control module 221, a voice codec 222, and an LCD control module 223. The output signal from the wireless module 100 is identified by the main control module 221 whether the output signal is control data or voice data by the main control module 221, and if the output signal is the voice data, it is supplied to the voice codec 222.

The voice data supplied to the voice codec 222 is voice-decoded, and the reproduced voice signal through the voice-decoding is loudly output from a loudspeaker 332 of the input/output module 300. An LCD 333 of the input/output module 300 displays a variety of items of information, for example, a telephone directory, a received electric field strength detection value, a remaining amount of a battery 441, etc., showing operation states of its own apparatus output from the main control module 221 through the LCD control module 223.

A key input module 334 is used for inputting various operation instructions to the terminal T5.

Meanwhile, a calling voice signal of the user output from a microphone 331 of the input/output module 300 is supplied to the voice codec 222 of the baseband module 200, and after voice-coding in the voice codec 222, the voice signal is supplied to the main control module 221. In the main control module 221, the coded voice data is multiplexed with image data or control data in a predetermined format, and the multiplexed transmission data is supplied to the antenna 111 through the wireless module 100 and transmitted toward the access point AP1 from the antenna 111.

The power source module 400 includes a battery 441, a charging circuit 442 for discharging the battery 441, and a voltage generation circuit (PS) 443. The PS 443 generates a predetermined power source voltage Vcc based on the output voltage from the battery 441.

Meanwhile, the main control module 221 includes a microprocessor, a ROM, and a RAM, includes a battery remaining amount detection module 221a and a service request transmission control module 221b other than a communication control function of performing connection control of the wireless LAN and speech control after establishment of a communication link.

The detection module 221a detects the remaining amount of the battery 441. The control module 221b communicates with the communication server SV via the wireless LAN, and when receiving an incoming call request, transmits the incoming call transfer request or the incoming call rejection to the communication server SV in response to the remaining amount of the battery 441 detected by the detection module 221a.

As mentioned above, in the second embodiment, since the incoming call requests or the incoming call rejections are transmitted to the communication server SV in response to the remaining amount of the battery 441 when receiving the incoming call requests at the respective terminals T1-T10, it is not necessary for the communication server side to manage the remaining amount of the battery 441 of the respective terminals T1-T10, thereby, the processing burden on the communication server SV can be reduced.

Other Embodiments

The invention is not limited to each embodiment given above. While each embodiment has described telephone terminals and personal computers as terminals by way of examples, the terminals may be battery-driven electric equipment such as game machines with communication functions mounted thereon.

While the second embodiment has described the example in which the incoming call rejections and the transfer requests are performed in response to the remaining amount of the battery, execution requests of other additional services may be transmitted to the communication server.

Other than this, in terms of a system configuration, a functional configuration of a communication server, configuration of terminals, a control procedure and its content of each communication service, etc., may be embodied in various modifications without departing from an aspect of the invention.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A server apparatus for executing communication connection between a first terminal being connected to a first communication network, and a second terminal being connected to a second communication network differing from the first communication network, wherein the first terminal is assigned a terminal ID and is driven by electricity from a battery, the server apparatus comprising:

a memory configured to store an electric quantity table and a communication media determining table, wherein the electric quantity table showing a correspondence relationship among the terminal ID, a communicable communication media type, and consumed electricity for executing media communication, wherein the communication media determining table shows a correspondence relationship among the terminal ID, a battery remaining amount, and a terminal consumed electricity maximum quantity; and a controller configured to acquire remaining amount information of the battery from the first terminal, and to refer to the electric quantity table and the communication media determining table to select a communication media based on the acquired remaining amount information of the battery and consumed electricity by the first terminal, when a request for the first terminal is received, and to assign the selected communication media to the first terminal, and to re-determine to change the communication media, when the battery remaining amount of the first terminal varies during communication, wherein the memory stores the electric quantity table showing a correspondence between the communicable communication media type, a media type and the terminal consumed electricity maximum quantity, wherein the controller determines the terminal consumed electricity maximum quantity based on the acquired remaining amount information of the battery and the communication media determining table, and determines the communication media based on the terminal consumed electricity maximum quantity and the electric quantity table.

2. The apparatus of claim 1, wherein the controller is further configured to update content of the electric quantity table and the communication media determining table, when a data change request is issued.

\* \* \* \* \*